June 12, 1934.  F. G. SANDERS  1,962,412
MOTOR COMMUTATOR CLEANER
Filed Oct. 2, 1933
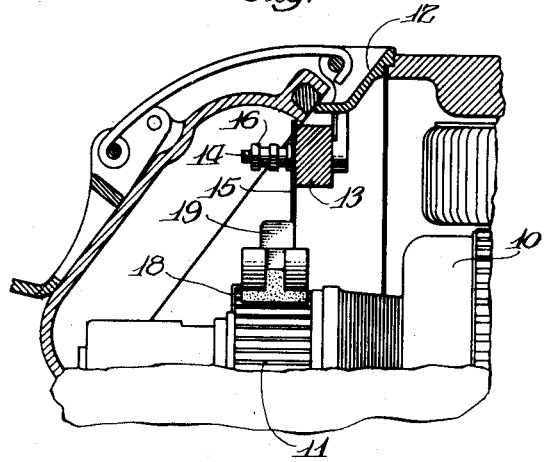
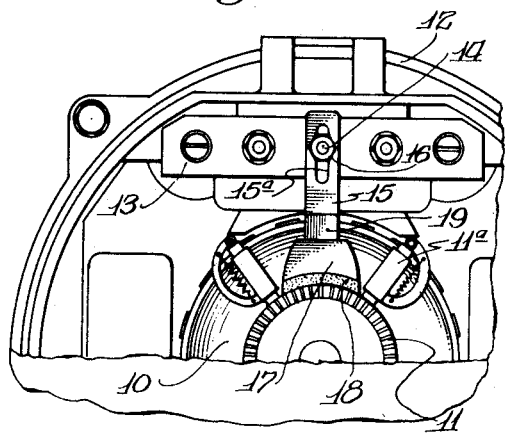
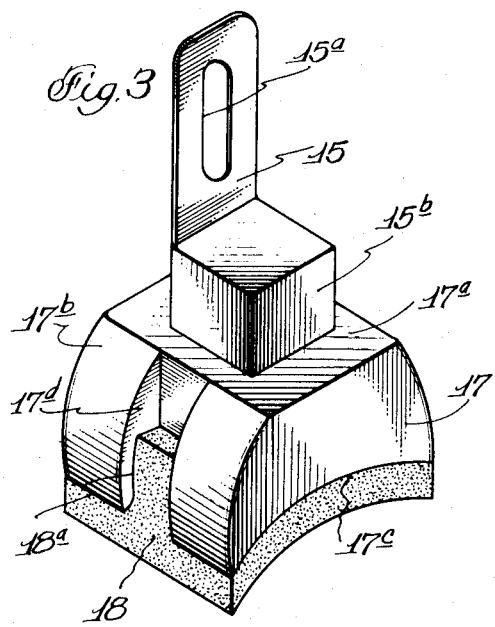
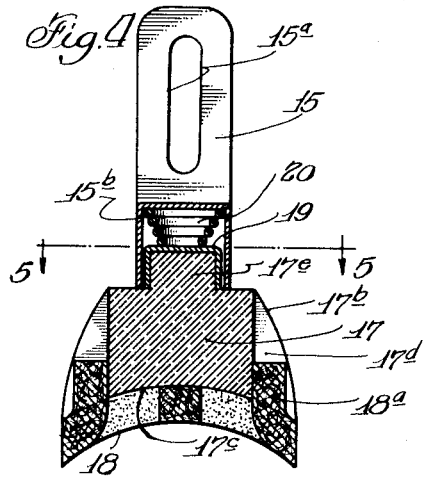
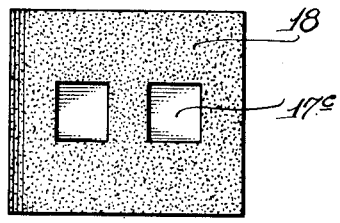
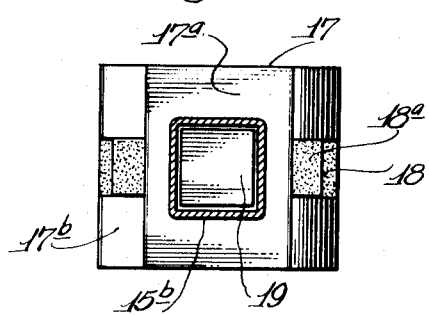
Inventor:
Frank G. Sanders.
Milo B. Stevens & Co.
By: Atty's.

Patented June 12, 1934

1,962,412

UNITED STATES PATENT OFFICE 1,962,412

MOTOR COMMUTATOR CLEANER

Frank G. Sanders, Chicago, Ill.

Application October 2, 1933, Serial No. 691,844

5 Claims. (Cl. 171—320)

My invention relates to commutators of electric motors, and more particularly to devices to keep the same clean, and my main object is to provide a device for this purpose which is highly efficient.

A further object of the invention is to provide a cleaner for the commutators of reversible motors, as surface accumulations have a greater tendency to remain and clog laminations thereof.

A still further object of the invention is to provide a device which is held firmly in engagement with the commutator and in proper position at all times.

Another object of the invention is to incorporate in the same a yieldable element which urges the cleaner into engagement with the periphery of the commutator.

An additional object of the invention is to construct the same of few and simple parts which are durable and require no appreciable attention or repair.

With the above objects in view, and any others that may suggest themselves from the specification and claims to follow, a better understanding of the invention can be had by reference to the accompanying drawing, in which—

Fig. 1 is a side elevation of a portion of a reversible motor, partly in section, and illustrating the application of the invention;

Fig. 2 is an internal view, taken from the left-hand side of Fig. 1;

Fig. 3 is a perspective view of the novel cleaner;

Fig. 4 is a cross-section thereof;

Fig. 5 is a section on the line 5—5 of Fig. 4; and

Fig. 6 is a bottom plan view of Fig. 4.

While cleaners for the commutators of motors in general are desirable to assure efficient service, this need is far greater in reversible motors, such as are used for the operation of railway switches. In this case, the accumulations of dust, congealed oil and foreign matter which gather on the periphery of the commutator are repeatedly swept back and forth by the brushes as the motor rotates in one or the other direction, instead of being swept off the commutator. Thus, the accumulations tend to remain on the surface of the commutator permanently and clog the same. It has therefore been my intention to provide a cleaner which absorbs the accumulations referred to and wipes the surface of the commutator whereby to maintain the same in a clean and proper state.

In carrying out the invention, specific reference to the drawing indicates a typical switch motor at 10, the commutator thereof at 11, the brush holders at 11a, the housing at 12 and the terminal bar carried thereby at 13.

I make use of the terminal bar to support the novel cleaner, employing one of the bolts 14 of such bar to receive the bracket 15 of the cleaner and secure the same by means of a nut 16. The bracket is a vertical strip of metal formed with a vertical slot 15a by means of which the height of the bracket can be varied relative to the terminal bar before the nut 16 is made secure.

The novel cleaner is a block of rubber 17 having a flat top 17a and sides 17b diverging downwardly with a curvature. The bottom 17c is arched from the sides, and the latter are divided midway between the ends to define cavities 17d.

The part immediately involved in the cleaning function is a felt shoe 18 which applies beneath the cleaner block, this shoe being approximately ¼" thick and having the arched form to fit the bottom formation of the block, as clearly shown in Fig. 3. Spaced tongues 18a are struck from the block and made to lodge in the cavities 17d of the block, the natural tendency of the tongues to return in place causing them to press on the inner walls of the cavities and so clamp the shoe to the block, this being clearly indicated in Fig. 4.

The block 17 is built up with a short, square stem 17e upon which is tightly fitted a square cap 19 of metal. The bracket 15 is formed at its bottom with a rectangular receptacle 15b which opens at the bottom and is of a size to smoothly receive the cap 19, when the bracket and block are assembled in the manner shown in Fig. 4. The receptacle 15b is of such height as to accommodate within it a conical coil spring 20, the base of this spring lodging against the top of the receptacle while the summit thereof bears against the top of the cap 19.

As the device is adapted to be mounted as in Figs. 1 and 2 whereby to overlie the commutator between the brush holders 11a, it follows that the curvature of the shoe 18 and its seat will be so calculated as to fit commutators of a given diameter, although the yieldable nature of the shoe will adapt commutators having a slightly greater or smaller diameter. When the device has been properly mounted, the cap 19 fully seats in the receptacle 15b as shown, this compressing the spring 20 to the extent that it urges the cleaner firmly into engagement with the periphery of the commutator. Thus, whenever moisture, dust, oil or other foreign matter develops on the surface of the commutator, it will be absorbed or taken up by the felt shoe of the cleaner, the same also exercising wiping action on the commutator.

The latter is thus kept clean at all times and enables the motor to function at its highest efficiency.

It will be evident from the above description that the novel cleaner is not only an article of extreme simplicity, but that its unitary assembly enables it to be quickly and easily taken apart in case it requires any attention or replacement. It is only necessary to loosen the nut 16 in order to free the parts of the device for separation, in which event it is an easy matter to replace the shoe in case it has become clogged or to renew the spring in case it has lost its tension, although these developments may be rare. The rubber construction of the block 17 imparts a certain amount of resiliency to the device, while the cap 19 serves as a reinforcement to prevent excessive wear of the block by the spring 20. Finally, the rectangular design of the cap and receptacle 15b assure the proper position of the cleaner relative to the commutator, the brush holders serving as lateral stops for the device in case the same receives a tendency to move in the direction of rotation.

I claim:

1. A commutator cleaner comprising a bracket, a receptacle extended from the same, a resilient holder, a shoe carried by the latter in a position to engage the periphery of the commutator, a stem on the holder extended into the receptacle, a metallic cap to reinforce the stem, and a spring between the base of the receptacle and the top of the cap to urge the holder and effect such engagement.

2. A commutator cleaner comprising a bracket adapted to extend from a support, a holder carried by the bracket, a shoe directed by the holder into engagement with the periphery of the commutator, said bracket being slotted in a direction from the support to the commutator, and securing means connecting the bracket and commutator and cooperating with the bracket slot to hold the bracket in any of its shifted positions.

3. A commutator cleaner comprising a bracket, a block of resilient material carried thereby, a shoe carried by the block in position for engagement with the periphery of the commutator, the block and shoe having cooperating formations to retain the shoe to the block.

4. A commutator cleaner comprising a bracket, a block of resilient material carried thereby, a shoe carried by the block in position for engagement with the periphery of the commutator, said block having opposed recesses, and tongues projecting from the shoe into the recesses of the block to retain the shoe to the latter.

5. A commutator cleaner comprising a bracket, a block of resilient material carried thereby, a shoe carried by the block in position for engagement with the periphery of the commutator, the block having opposed recesses, said shoe being struck out with tongues seating in the recesses and having an inherent tension to engage the block and retain the shoe to the latter.

FRANK G. SANDERS.